United States Patent [19]

Heinlein

[11] 4,194,235
[45] Mar. 18, 1980

[54] AUTOMATIC HEADLIGHT TILTING DEVICE FOR AUTOMOBILES

[75] Inventor: Werner Heinlein, Wiernsheim-Pinache, Fed. Rep. of Germany

[73] Assignee: Robert Bosch GmbH, Stuttgart, Fed. Rep. of Germany

[21] Appl. No.: 881,988

[22] Filed: Feb. 28, 1978

[30] Foreign Application Priority Data

Mar. 1, 1977 [DE] Fed. Rep. of Germany ....... 2706770

[51] Int. Cl.² .............................................. B60Q 1/12
[52] U.S. Cl. ........................................ 362/38; 362/71; 362/269; 362/286; 362/295
[58] Field of Search ..................... 362/38, 71, 43, 269, 362/295, 286

[56] References Cited

U.S. PATENT DOCUMENTS

| | | | |
|---|---|---|---|
| 3,859,516 | 1/1975 | Tuzson | 362/71 |
| 3,953,726 | 4/1976 | Scarritt | 362/286 |
| 3,955,173 | 5/1976 | Martin | 362/38 |
| 3,982,121 | 9/1976 | Martin | 362/269 |

*Primary Examiner*—Brooks H. Hunt
*Assistant Examiner*—J. L. Barr
*Attorney, Agent, or Firm*—Edwin E. Greigg

[57] ABSTRACT

A beam-tilting device for headlights of a motor vehicle in which pneumatic modulators respond to the degree of chassis loading, i.e. to the degree of vehicle spring compression and admit pressurized air or vacuum to one or the other side of a differential pressure servo mechanism which tilts the headlights in proportion to the differential load. In order to prevent unnecessary operation of the tilting mechanism during daylight operation of the vehicle, there is provided a monitor shut-off valve which is energized by the headlight switch and which blocks the supply of air to the modulators when the headlights are inoperative, thereby reducing wear and noise.

3 Claims, 1 Drawing Figure

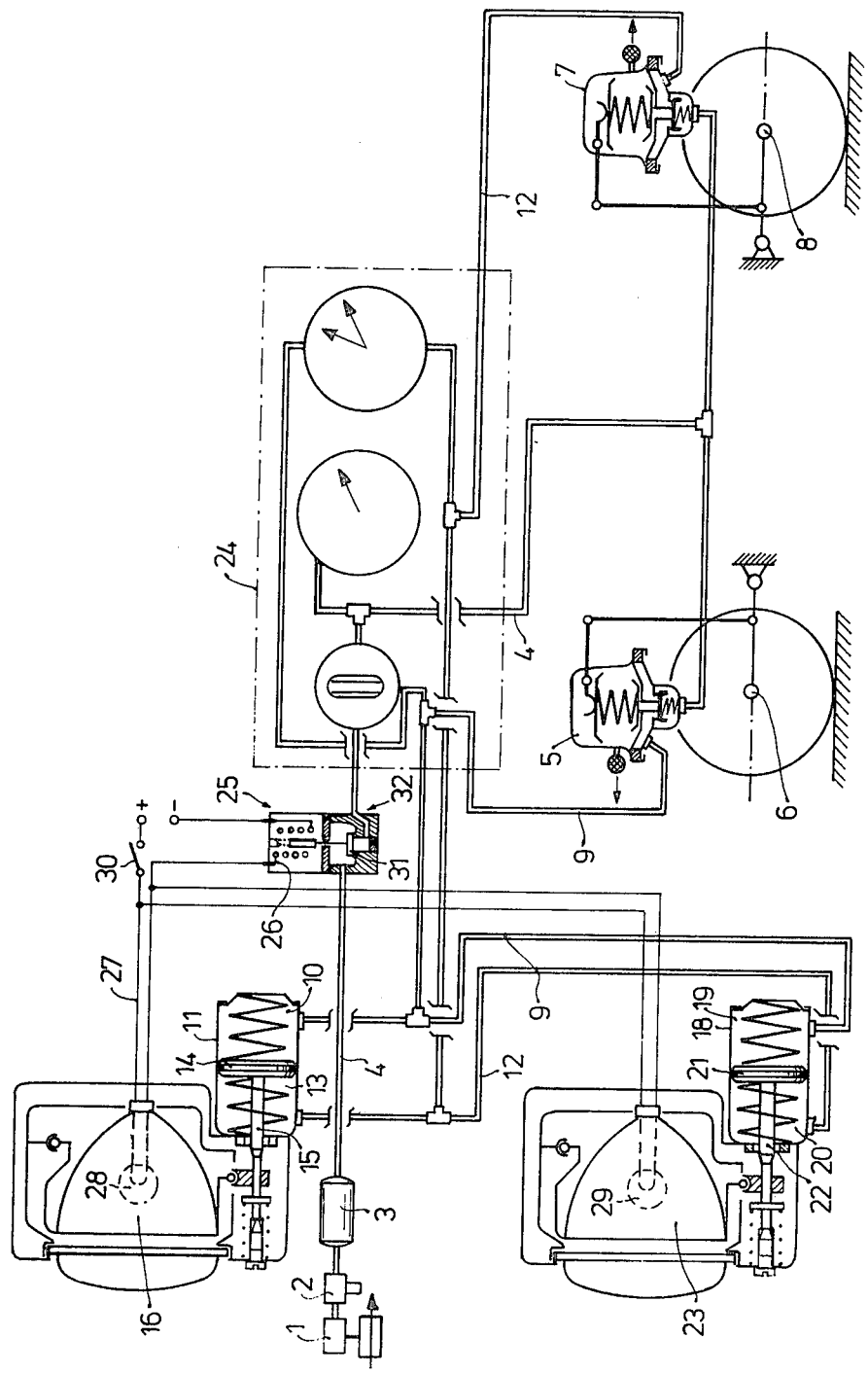

AUTOMATIC HEADLIGHT TILTING DEVICE FOR AUTOMOBILES

BACKGROUND OF THE INVENTION

The invention relates to a headlight adjustment apparatus for motor vehicles. More particularly, the invention relates to an apparatus which adjusts the beam angle of the headlights as a function of chassis load, i.e. the degree of spring compression.

Headlight beam adjustment systems of this general type are known, for example as described in DT-OS 25,20,357. It is a common characteristic of such systems that the overall adjustment mechanism remains fully functional at all times even when the headlights of the vehicle are not turned on, i.e. when it would be impossible to blind oncoming traffic with maladjusted headlights. It is a substantial disadvantage of the continuous functioning of the beam adjustment mechanism that movable parts of the system, especially the pressure sensitive modulators associated with the vehicle axles, are subjected to unnecessary wear and tear. Another disadvantage is that the pressure medium is being utilized at all times and must accordingly be replenished even though the headlights are not turned on. This necessary re-supplying becomes particularly disadvantageous if the source of pressure or vacuum must also supply other systems in the vehicle, for example the brakes, the steering and others.

OBJECT AND SUMMARY OF THE INVENTION

It is thus a principal object of the present invention to provide a headlight beam adjustment mechanism which includes the provision of becoming inoperative when the headlights are not being used. It is a secondary object of the invention to provide a headlight angle adjustment system in which the pressure sensitive modulators which translate the chassis loading are inoperative when the headlights are not turned on. Further objects of the invention are a reduction in the use of the pressure medium and an elimination of unnecessary mechanical and pneumatic noise in daylight operation of the vehicle.

These and other objects are attained according to the invention by providing a preferably electrically operated monitor which is activated together with the headlights and which arrests the operation of the headlight angle adjustment mechanism when the headlights are not energized.

The invention will be better understood as well as further objects and advantages thereof become more apparent from the ensuing detailed description of an exemplary embodiment taken in conjunction with the drawing.

BRIEF DESCRIPTION OF THE DRAWING

The single FIGURE of the drawing is a schematic diagram of a preferred exemplary embodiment of the invention.

DESCRIPTION OF THE PREFERRED EMBODIMENT

Turning now to the single figure of the drawing, there will be seen a compressor 1 supplying compressed air via a pressure regulator 2 to a pressure storage tank 3. The pressure storage tank 3 is connected through a pressure supply line 4 to a control unit 5 associated with a front axle 6 and a second control unit 7 belonging to a rear axle 8. The control units 5 and 7 which are units that are responsive to the distance of the chassis from the associated vehicle axle will be referred to hereinafter as modulators. The modulator 5 is connected via a line 9 with the first chamber 10 of a servo unit 11 while the modulator 7 is connected via a line 12 with a second chamber 13 of the same servo unit 11. A piston 14 which defines and separates the two chambers 10 and 13 is held in the central position by two springs and is connected by a piston rod 15 to a pivotable vehicle headlight unit 16. Similarly, the two lines 9 and 12 lead to a second servo unit 18 having chambers 19 and 20 and a piston 21 which tilts a second headlight 23 by means of a piston rod 22. The two servo units 11 and 18 operate on differential pressure.

Further included in the pressure supply line 4 leading to the modulators 5 and 7 is a test unit 24 and a monitor 25. The test unit 24 controls the overall supply of the system with pressurized fluid. This unit 24 is not the principal subject of the present invention. The present invention is particularly related to the monitor 25 which includes an electromagnet 26 with a coil which is part of an electric circuit 27 that contains the incandescent lamps 28 and 29 belonging, respectively, to the vehicle headlghts 16 and 23 which are turned on by a light switch 30.

Mechanically coupled to the armature of the electromagnet 26 is a valve-closing element 31 which controls the passage through the pressure supply line 4. The electromagnet 26 and the valve-closing member 31 together comprise a solenoid valve 32.

The mechanism described above operates as follows: Under normal conditions, the wheel modulators 5 and 7 occupy a substantially central position in which the air supply from the pressure supply line 4 in the servo units 11,18 is interrupted. If the chassis is displaced with respect to the axle 6 or 7, the modulators 5, 7 admit air into one or the other of the lines 9 and 12, thereby displacing the pistons 14 and 21 and tilting the associated headlights 16 and 23. When the chassis is unloaded, i.e. the springs relax, the control lines 9 and 12 are connected with a source of ambient air pressure within the modulators 5 and 7.

The pressure in the lines 9 and 12 is proportional to the distance between the chassis and the associated axles 6 or 8. The degree of tilting of the headlights is related to the difference in pressure in the control lines 9 and 12 as well as to the stiffness of the springs in the servo units 11 and 18. In known systems of this type, the valve closing elements of the modulators 5 and 7 are always loaded by pressure from the storage tank as long as the pressure supply line 4 is not interrupted. Accordingly, the linkages between the modulator and the vehicle axles 6 and 8 are always loaded. In addition, the operation of the modulators produces mechanical and pneumatic noise. This is true even if the pressure medium is actually a vacuum.

It is a particular and advantageous feature of the present invention that these latter effects are prevented if the headlights are not turned on, for example during daylight operation. This situation is depicted in the figure by an open light switch 30 and an open coil of the electromagnet 26. In such a case, the pressure supply line 4 is blocked and there is no usage of pressurized medium. The headlight beam tilting mechanism is thus inoperative under those conditions. If, on the other hand the switch 30 is closed, thereby energizing the vehicle headlights, the solenoid valve 32 opens, permitting pressurized medium to flow from the storage tank 3 through the line 4 to the test unit 24 so that the headlight beam tilting mechamism is able to operate normally. By causing the beam tilting mechanism to be inoperative when the headlights are not turned on, the modulators 5 and 7 are subjected to a reduced amount of wear and tear and the usage of pressurized medium is reduced.

The foregoing relates to a preferred exemplary embodiment of the invention, it being understood that other embodiments and variants thereof are possible within the spirit and scope of the invention.

What is claimed and desired to be secured by Letters Patent of the United States is:

1. In an apparatus for automatically adjusting the beam angle of motor vehicle headlights, which includes a headlight switch for energizing the headlights from the vehicle electrical system and modulators linked to the vehicle axles and responsive to the chassis-to-axle distance for supplying fluid of varying pressure to servo-mechanisms connected to tilt the headlights, the improvement comprising a normally closed electromagnetic valve disposed in a conduit between a source of pressurized fluid and said modulators and connected in parallel with said headlight switch, so that said valve is opened to activate said beam angle adjusting apparatus only when said headlight switch is closed.

2. An apparatus as defined by claim 1, wherein said fluid is air at higher than atmospheric pressure.

3. An apparatus as defined by claim 1, wherein said fluid is air at lower than atmospheric pressure.

* * * * *